June 21, 1955  R. W. ANDREASSON  2,711,324
INDEXING DEVICE FOR MACHINE TOOLS
Filed Oct. 3, 1951  3 Sheets-Sheet 1
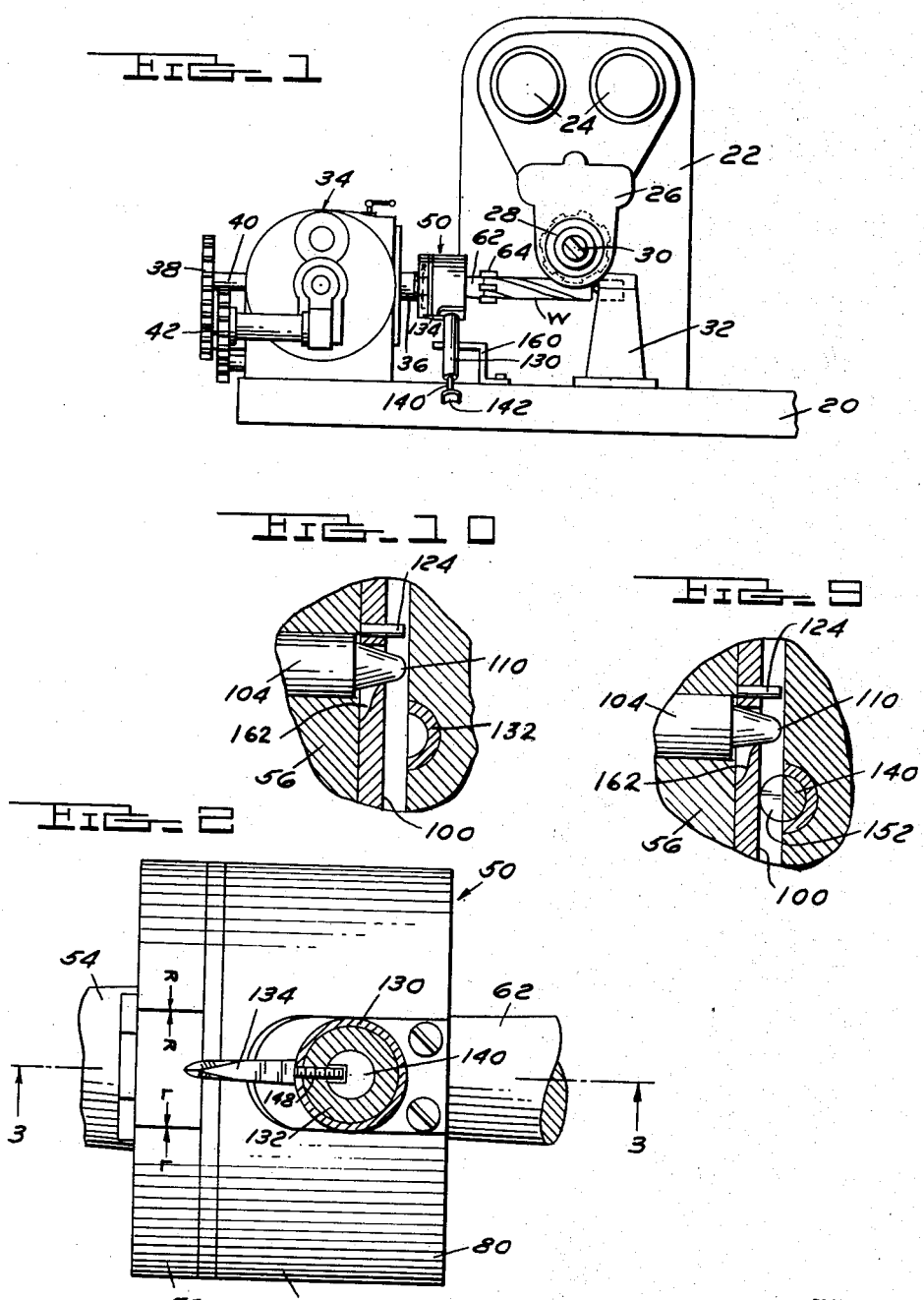
INVENTOR.
RUDOLF W. ANDREASSON
BY
Barnes, Kisselle, Laughlin & Raisch
ATTORNEYS

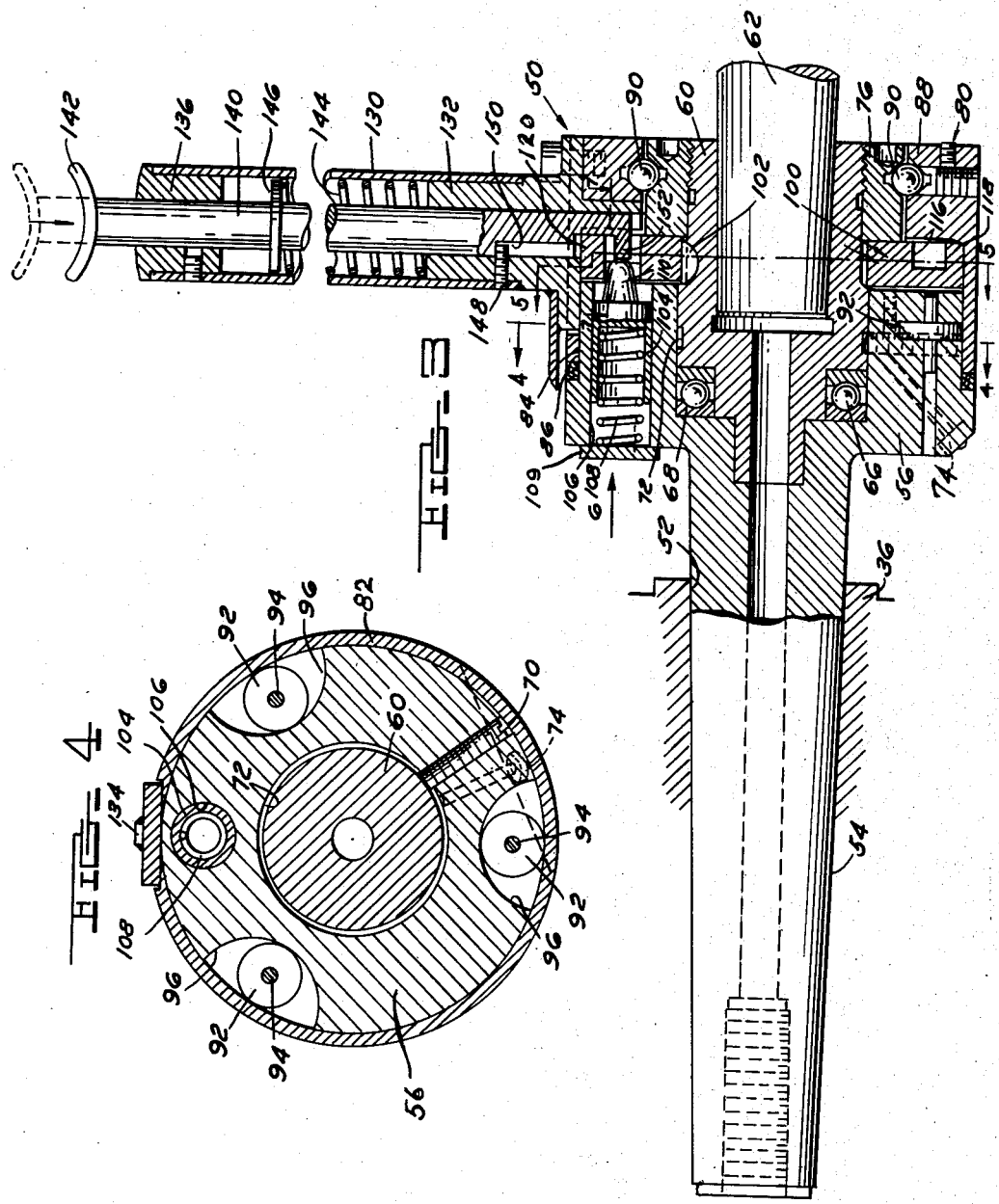
INVENTOR.
RUDOLF W. ANDREASSON
BY
Barnes, Kisselle, Laughlin & Raisch
ATTORNEYS

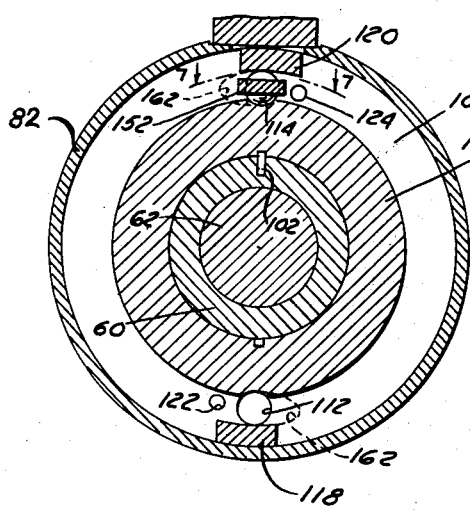
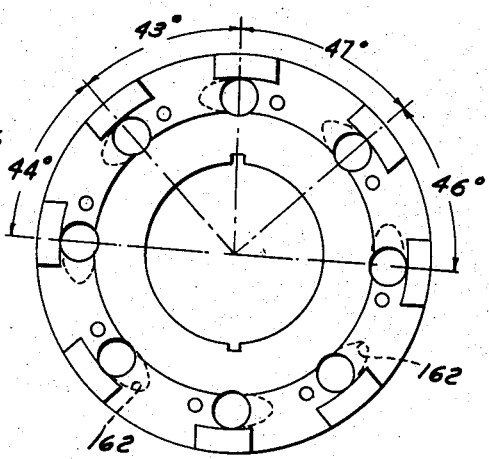
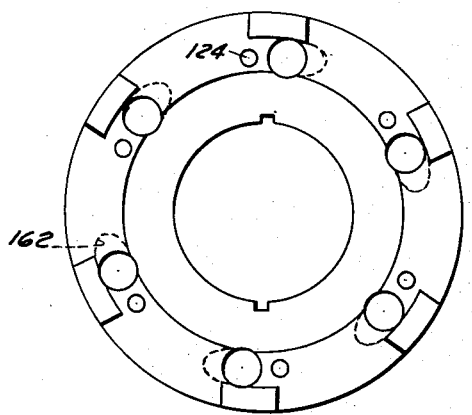
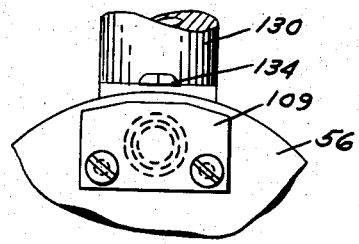
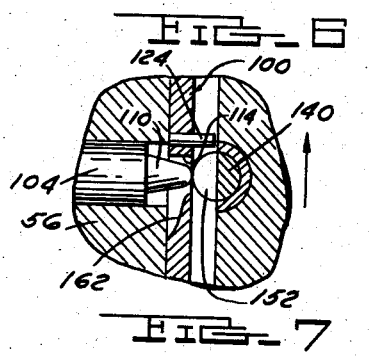
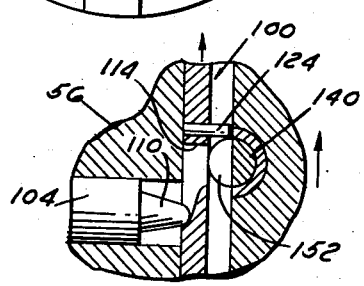

United States Patent Office 2,711,324
Patented June 21, 1955

2,711,324

INDEXING DEVICE FOR MACHINE TOOLS

Rudolf W. Andreasson, Detroit, Mich.

Application October 3, 1951, Serial No. 249,521

17 Claims. (Cl. 279—5)

This invention relates to an indexing device for machine tools.

In machine shops today it is common to use on milling machines an attachment known as a universal spiral index center. This device, sometimes called a dividing head, permits indexing of work being milled and is used especially in the making of cutters, ratchets, gears, reamers, drills and taps.

Dividing heads commonly in use require careful attention of skilled machine operators, both in the setting up and in the actual indexing operation. Control handles must be turned a certain number of times, plus a fraction of a turn in many cases, to index a particular reamer or gear for the next cut.

Objectionable wear on this type of head appears at many points to destroy the accuracy of the setting. Furthermore, the actual time required for indexing, when totaled for any particular work period, amounts to a considerable portion of the time applied to the job. Any mistakes in counting the index turns result in scrapping the piece.

The present invention contemplates an indexing device which may be applied to milling machines for production work. It is designed and arranged so that a simple manual operation, unwatched and uncontrolled by the operator, will result in accurate and infallible indexing of a work piece or other part of a machine.

The present device has the advantage of adaptability to rotating or non-rotating work. It may be applied to an ordinary work holder or an elaborate dividing head, and it may be used on right- or left-hand machines for right- or left-hand indexing. It is equally applicable to uniform indexing or staggered indexing.

The device is not subject to inaccurate operation by reason of wear in continued use and may be operated with one hand of the operator. The design permits complete protection of the parts from chips and dirt.

Briefly, the indexing device to be disclosed consists of a three-part, co-axial housing in which one part is mounted on a machine head stock, a second part mounts a work piece, and a third part houses the first two and contains also an actuating lever to disengage the first two and simultaneously rotate them relative to each other. Novel means is provided to engage the first two parts for mutual rotation and to limit indexing rotation between the same to specified included angles.

Details of the construction and operation and further objects of the invention are to be found in the following description and claims.

Drawings accompany the disclosure, and a brief description of the various views thereof is as follows:

Figure 1, a partial view of a milling machine showing the invention installed.

Figure 2, an elevation view of the indexing unit.

Figure 3, a sectional view of the indexing unit taken on line 3—3 of Figure 2.

Figures 4 and 5, transverse sectional views taken respectively on lines 4—4 and 5—5 of Figure 3.

Figure 6, a partial elevation on line 6 of Figure 3.

Figure 7, a sectional view on line 7—7 of Figures 3 and 5.

Figures 8, 9 and 10, views similar to Figure 7 showing the parts in different relative positions.

Figure 11, a view of an optional indexing plate to be mounted in the device showing eight indexing positions in staggered relation.

Figure 12, a view of a second optional indexing plate showing six evenly divided indexing positions.

Referring to the drawings, in Figure 1 the upper portion of a milling machine is shown having a table 20, an overarm support 22, double overarms 24 supporting a milling cutter head 26, and a milling cutter 28 mounted on a power driven spindle 30. A tail stock 32 is slidable on the table 20, and a dividing head 34 is mounted on the table 20.

A spindle 36 of the dividing head is driven by a gear 38 mounted on a shaft 40. Suitable gears including a driven gear 42 operate the spindle 40 when necessary for work having spiral flutes or spiral teeth. Mounted on the spindle 36 of the device is the indexing device 50 of the present invention.

The spindle 36, Figure 3, has a tapered opening 52 to receive a tapered mounting shaft 54 on the indexing device 50. The indexing device consists of a main member 56 forming a head on the tapered shaft 54 concentric with said shaft and a second main member 60, a chuck mount, concentric with the head 56 and mounted in said head for free rotation relative thereto.

In Figure 3 this mounting member 60 is shown with a tapered shaft 62 mounted therein, this being the shaft of a chuck 64 (see Figure 1). Thrust bearings 66 are positioned in a recess 68 formed between the member 60 and the head 56. A set screw 70 positions these members 56 and 60 relative to each other, the end of the set screw operating in an annular groove 72 on member 60.

An oil cup opening 74 extends at an angle into the groove 72 and serves to transmit oil to the bearings 66. Threaded on the member 60 is a collar 76 which, in conjunction with other parts of the assembly, holds the assembly together.

A third main member 80 of the combination completes the housing unit of the device, this third member consisting of a cylindrical seal portion 82 rotatably associating with a reduced portion 84 over head 56. A felt ring seal 86 impregnated with lubricant keeps out dirt and foreign particles from the assembly.

The member 80 has an inwardly extending annular portion 88 locked in association with the ring member 76 by a double race bearing channel, one race in each part, filled with ball bearings 90.

The member 80 is thus freely rotatable with respect to the ring 76 which is threaded onto the inner member 60. The cylindrical portion 82 of the member 80 is related to the reduced portion 84 of the member 56 by roller bearings 92 shown best in Figure 4. These bearings are mounted on small axles 94, and each bearing operates in a semi-circular recess 96 in the head 56 as shown in Figure 4.

The parts 56, 60 and 80 are thus arranged concentrically, each freely movable with respect to the other. The relationship between the parts is defined by a fourth element to be referred to as an indexing plate. This plate is shown in Figure 3 in section at 100. In Figure 5 a sectional view of the assembly on line 5—5 of Figure 3 shows the plate partially in section. The plate is slidable on the reduced end of member 60 and keyed thereto by a key 102. A slight fillet in member 60 is provided to space the face of plate 100 from the face of head 56. A spring-pressed plunger 104 in head 56 defines the rotative position of plate 100 relative to head 56. This plunger is mounted in a cylindrical recess 106 in member 56, the recess having an axis spaced from and parallel to the axis of the concentric members.

The plunger is backed by a spring 108 held in position by a plate 109, and the plunger has a tapered nose portion 110 which is intended to co-operate with holes 112 and 114 in the plate 100. Since the plate 100 is keyed to the member 60 and the plunger 104 is mounted in the member 56, it follows that as long as the plunger nose 110 is positioned in one of the holes of the plate there can be no relative rotation between shaft 54 and the shaft 62.

The plate 100 is provided with a hub portion 116, and outside of each hole 112 and 114 is positioned an axially extending lug 118 and 120 extending from the plate 100 in a direction of the hub 116. Between the lugs 118 and 120 and the hub and to one side of the holes 112 and 114 are stop pins 122 and 124.

An indexing mechanism is provided to permit a change of relationship between the plate 100, mounted on and moving with inner work-holding member 60, and the hub portion 56 on mounting shaft 54. This indexing mechanism is operated by a tubular handle 130 shown in Figures 1 and 3 and shown in section in Figure 2.

The tubular handle is mounted on a stub projection 132 extending from housing 80; and as shown in Figure 2, it will be seen that a pointer 134 permits visible reference between the member 56 and the housing 80 for purposes which will later be described.

At the outer end of the tubular portion 130 a guide plug 136 is fastened, and in the handle a plunger 140 operated by a finger piece 142 extends centrally of the tubular portion 130. This plunger is urged outwardly by a spring 144 acting on a locator disk 146. The plunger is prevented from rotation by a set screw 148 in part 132 which projects into a slot 150 near the inner end of the plunger. Below the slot 150 the plunger is cut away to the center, leaving a semi-circular projection 152 at the extreme end extending in the direction of the plunger 104 (see Figure 3).

In the operation of the device, as it is being used to index for helical flutes of a reamer, for example, or drill as shown in Figure 1, the drill W is mounted in chuck 64 at one end and at the other end in tail stock 32. A dividing head 34 is suitably set up to rotate the work the proper number of degrees for the cut and the table is automatically fed the proper distance.

With the indexing device 50 mounted as shown, the handle 130 lies on a rest 160 which may have a magnetic attraction for the handle to keep it from moving unless intentionally lifted. Since the hub 56 is rotatable with the plate 100 because of the spring-pressed plunger 104, and the plate 100 is keyed to the chuck holder 60, it will be seen that rotation imparted to the spindle 36 will be transferred to the work W.

At the end of the working of one flute and after the machine has been retracted ready to cut another flute, it is necessary to index the work W to the next cutting position. With the plate shown in Figure 5, the next cutting position is 180 degrees away from the original cutting position. For this reason the index holes 112 and 114 are disposed on opposite sides of the plate diametrically opposed.

To index the device the handle 130 is lifted there until the pointer 134 is moved up to the line indicated by R—R shown in Figure 2. At this point the semi-circular lug 152 on the end of plunger 140 may project down past lug 120 (see Figure 5).

Upon further motion of the handle 130 the semi-circular projection or lug may enter the space between the hub 116 and lug 120.

In Figure 10 a sectional view shows the parts prior to the depressing of the plunger 140.

Figure 9 shows the parts after the plunger has been depressed. When the plunger is now shifted further away from the operator, projection 152 cams the nose 110 of plunger 104 back to the position shown in Figure 6.

On one side of the hole 114 in Figure 6 it will be seen that the plate 100 is formed with a cam surface 162. Further movement of the indexing handle will move the semi-circular lug 152 against pin 124 (see Figure 8), thus causing a shifting of the plate 100 with respect to member 56.

Movement of plate 100 will cam plunger 104 back further so that it will ride against the back of plate 100 until the plate 100 is moved to the point that the plunger can enter the hole 112, thus stopping the further motion. A return motion on the handle 130 will permit retraction of the plunger 140, and no further motion of the plate 100 can take place until the operation is repeated.

The nose portion 110 of the plunger 104 is preferably formed in such a way that any wear on the nose portion as it enters the holes 112 and 114 will simply permit the plunger to enter a little further without becoming loose. Thus the accuracy of the device will not be disturbed by any wear of these parts.

It will be seen that the lugs 118 and 120 prevent movement of the semi-circular lug 152 against the nose portion 110 except from the proper side as shown especially in Figure 5.

The plate 100 may be removed and other plates substituted therefor. In Figure 11 a plate is shown having eight holes or stations and also showing that the stations may be staggered with respect to each other; that is, not evenly spaced around the center of the plate.

In Figure 12 a plate is shown with six evenly spaced stations. By rotating the center member 60 relative to the collar member 76 (see Figure 3) it is a simple matter to remove the entire outer housing 80 together with the ring 76, thus exposing the plate 100. This plate may then be removed and another plate as shown in Figures 11 and 12 substituted therefor.

The plate shown in Figure 12 is designed for left-hand indexing, in which case the handle 130 would be resting on the other side of the machine as shown and would be brought toward the operator in the indexing operation. The line L—L on head 56 would be used to position the pointer 134 preparatory to depression of plunger 142.

Also, it happens frequently that the dividing head on a machine is mounted on the right-hand side of the machine instead of the left hand as shown in Figure 1. Thus, by reversing the plates, proper indexing can be obtained, either right- or left-hand indexing on either side of the work table.

In each case the projection 152 partially depresses the plunger nose 110 and the cam surface 162 following the holes in plate 100 completes the retraction movement when plate 100 starts to rotate.

In each case it is necessary only for the operator in a one-hand operation to bring the pointer 134 to the proper line L—L or R—R, depress the plunger 142, and move until the nose portion 110 enters the next indexing hole, after which further movement is prevented and the operating handle may be returned to its resting position and the machine started for another cycle. Only one indexing position can be reached at one time.

It is unnecessary for the operator to measure or count the amount of motion since it is entirely controlled by the internal mechanism of the indexing device.

It will be noticed that the mechanism of the device is completely housed within the three parts 56, 60 and 80 so that it is impossible for dirt and foreign particles to get into the housing to disturb the relationship of the parts.

What I claim is:

1. An indexing device for machine tools having a headstock comprising a portion to be affixed to the headstock of the machine; a portion to be affixed to the work, said portions being associated in releasable engagement and for relative rotation when disengaged, means to engage said portions and to limit relative rotation of said parts to fixed intervals, and means selectively operable in a defined path of movement to cooperate with said first means to temporarily disengage said portions and further operable in said same path of movement to engage one of said portions to effect a fixed relative rotation between said portions.

2. An indexing device comprising a first part for mounting the device, a second part rotatably associated with the first part for mounting a piece to be indexed, a first means to lock the parts against rotation comprising a member associated for rotation with one of said parts, and releasably associated for relative rotation with the other part, and a second means movable to temporarily engage with a portion of said first means to release it for relative rotation with the part with which it is so associated and further movable to contact the other of said parts to effect relative rotation between said parts subsequent to such engagement, said relative rotation being limited by the first means.

3. An indexing device comprising a first part for mounting the device, a second part rotatably associated with the first part for mounting a piece to be indexed, a first means to lock the parts against rotation comprising members respectively associated for rotation with each of said parts and releasably associated for relative rotation with each other and the other part, and a second means movable to temporarily engage with a member of said first means to release it for relative rotation with the part with which it is so associated and movable to engage with another member of said first means subsequent to said first engagement to effect limited relative rotation between said parts.

4. An indexing device comprising a first part for mounting the device, a second part rotatably associated with the first part for mounting a piece to be indexed, a first means to lock the parts against rotation comprising an axially disposed spring backed plunger on one of said parts and a plate on said other part perforated to receive said plunger at spaced intervals of rotation, and a second means movable to temporarily engage with said plunger to release it from a perforation in the plate and further movable circumferentially past said plunger to temporarily engage with said plate to shift it and the part on which it is mounted in a relative rotation with the other part limited by reengagement of said plunger with said plate.

5. A device as defined in claim 4 in which the plunger cooperates with the perforated plate to limit the rotation of the parts subsequent to release of the plunger by the second means.

6. A device as defined in claim 4 in which the second means comprises a third part mounted on said first two parts and freely rotatable relative thereto, and means on said third part manually operable to retract said plunger and subsequently to engage one of said first two parts to effect relative rotation therebetween.

7. A device as defined in claim 4 in which the plunger has a tapered portion to engage the margins of the perforations in said plate.

8. A device as defined in claim 4 in which the second means comprises a housing co-axial with and enclosing portion of said first two parts and freely rotatable with respect thereto, and means on said housing manually operable to retract said plunger and subsequently to engage one of said first two parts to effect relative rotation therebetween.

9. A device as defined in claim 4 in which the second means comprises a third part mounted on said first two parts and freely rotatable relative thereto, and a manually operable plunger positioned radially of the axis of said parts movable inward to contact and retract said plunger and movable peripherally of said parts to effect relative rotation therebetween.

10. A device as defined in claim 4 in which the perforated plate has cam surfaces formed on one side of each of its perforations to contact and cam inwardly the plunger after actuation of the plunger by said second means and during actuation of the plate by said second means.

11. A device as defined in claim 4 in which the plunger projects through the plate when positioned at a perforation therein to lock the plate and its respective part in place, and in which the second means comprises a projectable member manually operable to retract the plunger to release the plate for rotation relative to the part in which the plunger is located.

12. A device as defined in claim 11 in which the retracted plunger rides on the surface of the plate between perforations while the relative rotation between the part and the plate occurs.

13. A device as defined in claim 12 in which the plate has cam surfaces formed on one side of each of its perforations to contact and further retract the plunger subsequent to actuation by the projectable member and during the relative rotation between the part and the plate.

14. A device as defined in claim 11 in which the projectable member moves radially toward the axis of said parts and then circumferentially to retract the locking plunger, and means is provided radially outside of said perforations on said plate to prevent direct radial contact of said projectable member with said locking plunger.

15. A device as defined in claim 4 in which the plate is readily removable, and a plurality of plates having different numbers of perforations for assembly individually and selectively in said device.

16. An indexing device adapted for use selectively in the dividing head of a right-hand and left-hand headstock of a milling machine and selectively usable for right-hand and left-hand indexing comprising a first part for mounting in the headstock for stationary and rotating service, a second part rotatably mounted on said first part co-axial therewith for holding a work chuck, a divider plate co-axial with and mounted on one of said parts, releasable means on the other of said parts to lock said plate in a plurality of different angular positions with respect to said last-named other part and thus to lock said parts in said separate positions, and a second means operable progressively to release said locking means and shift said parts step-by-step to a plurality of different positions, comprising a co-axial housing freely rotatable with respect to said parts, and means in said housing projectable inwardly to disengage said releasable means and cause the step-by-step rotation of the parts.

17. A device as defined in claim 16 in which the divider plate has a plurality of stations for engagement with the releasable means, and means to permit projection of said projectable means only between said stations.

References Cited in the file of this patent

UNITED STATES PATENTS

| | | |
|---|---|---|
| 1,036,720 | Robinson | Aug. 27, 1912 |
| 2,239,260 | Turrettini | Apr. 22, 1941 |
| 2,267,647 | Ghaye | Dec. 31, 1941 |
| 2,335,721 | Zagar | Nov. 30, 1943 |

FOREIGN PATENTS

| | | |
|---|---|---|
| 560,561 | Great Britain | Apr. 7, 1944 |
| 570,645 | Great Britain | July 16, 1945 |